United States Patent [19]

Andrews

[11] 3,769,872
[45] Nov. 6, 1973

[54] MUSIC EDUCATIONAL SYSTEM
[76] Inventor: Violet Katzner Andrews, 35 W. 81st St., New York, N.Y. 10024
[22] Filed: Apr. 8, 1971
[21] Appl. No.: 132,587

[52] U.S. Cl. .............................................. 84/470
[51] Int. Cl. .......................................... G09b 15/00
[58] Field of Search...................... 84/470, 471, 476

[56]  References Cited
     UNITED STATES PATENTS
2,123,258   7/1938   Ranger................................. 84/470
1,637,478   8/1927   Downs.................................. 84/471
1,653,458  12/1927   Green................................... 84/470
3,601,904   8/1971   Elliott et al....................... 84/470 X Primary Examiner—Richard B. Wilkinson
Assistant Examiner—Lawrence R. Franklin

[57]  ABSTRACT

A visual-aural combination: the visual component embodied by a playing board having a plurality of positions formed to receive a plurality of movable members representing consecutive musical units, the aggregate of all the musical units when positioned on the playing board forming a composite musical design; the aural component, closely correlated with the visual component, embodied in a phonorecord capable of reproducing by selection individual musical units, groups of musical units, and finally, the aggregate of all the musical units continuously as a composite musical design.

4 Claims, 5 Drawing Figures

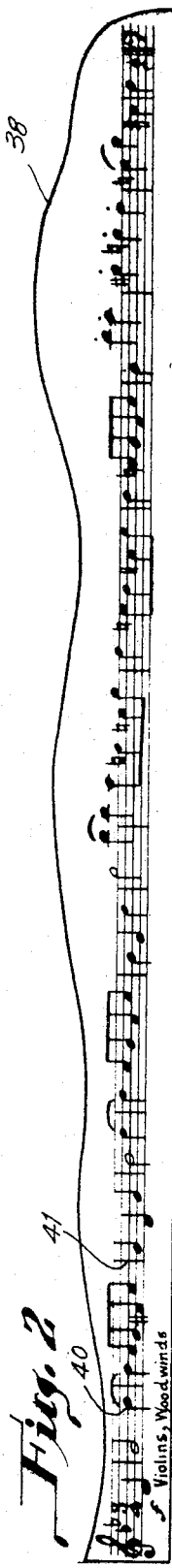

MUSIC EDUCATIONAL SYSTEM

This invention relates to a correlated visual-aural system of music education, its particular object being to develop the art of listening to music, i. e., the 'appreciative' aspect of musical experience.

As music is an aural art, genuine appreciation thereof is conditioned by the capacity of the listener to aurally apprehend a musical work as a whole unified design; to aurally follow the progressive unfolding of the constituent elements of the whole; and most, importantly, to retain in the memory an aural image of the whole so heard.

Fundamental to cultivating such perceptual aptitude, is the necessity to hear and respond to what music has to say 'music qua music' — as distinct from extraneous 'programme' associations — and this is facilitated by an initial grasp of the overall horizontal dimension of a composition, i. e., the principal line that pervades the score from beginning to end, welding it together as a structured and connected whole. Without a firm aural hold on this comprehensive principal line, the sense and continuity of the unfolding music gets lost in a confusing chaos of sound.

For the purpose of illustrating the present invention and in no limiting sense, this application will consider the principal line as 'melody' — as it is characterized in the body of musical literature of the greater part of Western art music — melody being the succession of single tones in horizontal relationships predominating over the harmonic texture of tones vertically and simultaneously combined, and melody as having a musicological destiny — such as in a symphony — pursuing thematic argumentation in manifold rhythmic contexts and in logical order toward a conclusion.

To hear and retain in the aural memory the outlining of melodic continuity as an ordered compact whole, is a mark of musicianship in listening, clarity in listening being a sovereign outcome of all music education. Accordingly, the primary object of my invention is to provide a facilitated means of grasping meaning and structure — whether of a simple song form or a full length symphony — through a compositions's 'melodic outlining.'

Unlike the visual arts of painting, sculpture and architecture which are 'stationary' structures, a music structure unfolds in time 'progressively,' and the fleeting passage of its horizontal melodic line is difficult to grasp as a unified design. It is desired therefore, that through the visual symbol of music — the notated score — the overall melodic line appear in stationary semblance that can be perceived immediately and directly as a visual whole.

This is not possible in the 'full score' system for choral and orchestral works, the 'full score' necessarily being the means — in multiple staved format — of bringing combined 'voices' or 'parts' into vertical relation with one another. Consequently, for the purpose of apprehending the horizontal dimensions as a structured and connected unity, the traditional issue of the multiple staved 'full score' erects so many hurdles, even for the specialized music student, as to be of no help whatever — in fact a hindrance — for the listener of average skill in reading music. This is manifest by the following factors:

In the conventional system of printing 'full scores,' page layouts are cast in far too rigid and narrow a mold to portray, with clarity, the broad horizontal expanse of melodic continuity and its structured unity. Page layouts of 'full scores,' where spacing is rigidly disciplined by the vertical aspect of part writing, are aimed primarily, for accuracy of positioning simultaneous tones timed together and secondly, for symmetry of margin and note-head spacing for typographical good appearance. While these page layouts may be mechanically correct and agreeable to the printer's eye, they remain 'unmusical' to the musicians's eye, because they fail to bring out 'musicianly' structure of melodic outlining.

In general, the standard 'full score' format obscures the visual appearance of 'phrasing,' i. e., musical units that define structure and give intelligent point to a page of music notation. In a 'full score,' even a single theme can rarely be viewed as a meaningful unit for the fact that most often its phrasing is severed — part on one page, the rest on the next — the abrupt break constituting an interruption in musical articulation. This appearance of severed phrases and themes obscures further the relationships to each other of thematic wholes and the position of each in the overall melodic outline.

In addition to the above, there are other shortcomings endemic to the traditional 'full score' to hinder grasp of melodic outlining. For instance, in a work composed for say as many as 20 instruments — hence that number of staves barred vertically together one above the other — to catch hole of the continuous melody line tossed from one to another amongst them, the eye must gravitate up and down the height of a multiple staved page of score. And in passages where certain instruments do not participate, their respective staves are excluded — as in the economy score printed for student consumption — and several such minimal staved pages, with a slight separation between them, are pressed into the space of one page. This causes the notation of a single participating instrument to fall at different rading levels on the one compressed page, as well as from page to page. Thus, to pursue the melodic line — in addition to up and down — the eye must travel zigzag, across and back, even for a sustained passage carried by a single instrument.

Yet another and serious impediment in the 'full score' to plague any score reader, is the multiplicity of keys and clefs on the notated page. This is caused, (1) by the peculiarity of the 'transposing instruments' whose parts are notated in one key yet sound in another when played, and (2) by the 'movable' clef system in which notation is written in a number of clef positions other than the familiary and fixed treble and bass. With a 'full score' therefore, the reader must mentally transpose and adjust keys and clefs to consistent notation, all at the same time as his eyes move up-down, crosswise and zigzag — throughout numerous pages — pursuing thematic continuity and attempting to grasp the sense of the whole. This is a frustrating pursuit for the average score reader, for oft as not, before he has seized hold of a fragment of theme and turned a page, the momentum of sound has swept several pages ahead, the wholeness of even a single theme eluding him altogether — visually and aurally.

It is manifest that the 'full score' generally is too unwieldy to correlate effectively in a visual-aural study program. To follow a 'full score' is a formidable feat, and in many cases approximates a technical stunt in overcoming the endemic difficulties described above rather than evidence of musicianly comprehension. To apprehend melodic outlining with clarity is difficult even for the experienced musician and conductor specially practiced in the skill of score reading. Obviously for the student and average listener, a facilitated and more effective system is necessary.

By my invention, the disadvantages and encumbrances described in the foregoing are eliminated for the student and average listener whose initial focus is upon the musical 'whole' as revealed through melodic outlining. As will become manifest as the application proceeds, the visual-aural system of my invention provides an instant visual means of apprehending the melodic whole, the aural means being correlated with the visual means in such manner that the visual sense of the whole is converted immediately and directly into an aural sense of the whole.

The visual means will be represented by a 'skeleton score' system wherein the entire melodic line is isolated from the 'full score,' delineated in a functional manner, and graphically laid out so that its structure and meaning are visible at a glance. The aural means will be expressed by a 'full score' rendition of the same work as embodied in the visual means, and correlated with the functional delineation thereof. The synergetic action of the two means — by which the isolated visual line is apprehended as a distinct aural line heard in high relief against the background of full harmonic texture — is contemplated to exert the most salutary effect upon the listener.

Thus, by the direct and effective means of my invention — even for those who can follow only a single line of music notation — the realm of music literature is made more readily accessible by being made more immediately intelligible. The average listener will discover that with repeated hearings and greater familiarity with the single molodic line, the simpler harmonies and accompaniments also become transparent to the ear. The serious student will find that when grasp of the musical 'whole' of a large and complex work such as a symphony is so immediate and direct, he can be spared many hours of tedious toil and become more quickly prepared to move on to intensive study of the harmonic-contrapuntal and other dimensions of the work.

As illustrative and in no limiting sense, the unique objects and advantages of my system may be made manifest in the present disclosure by a specific visual-aural embodiment of a 'puzzle game-phonorecord' combination. The puzzle game will embody the principal line of a multiple voiced work of any compositional style, including preexisting and newly published works of my series, Symphonic Skeleton Scores, of which No. 6 of the series, Symphony in G Minor by W. A. Mozart, Copyright 1941 by Theodore Presser Co., Copyright renewed 1969 by Violet Katzner, is reproduced in part in the accompanying drawings as representative and illustrative. The phonorecord will embody a 'full score' rendition of a preexisting or newly recorded performance of the same work embodied in the puzzle game, the puzzle game and phonorecord embodiments together reinforcing one another — vividly and engagingly — as an integrated system of study of high educational as well as enjoyable value.

Coupled with the 'puzzle game-phonorecord' will be a 'skeleton score,' in fixed printed format including informatory matter, to serve as 'master' of 'key' score for reference or preparatory study. The correlated 'puzzle game-phonorecord' will be best understood by preliminary discussion of the elements of the 'skeleton score' itself, for it will be found that when all the movable members of the puzzle game have been put together in assembled relation, the aggregate thereof will appear as a facsimile of a page of the key 'skeleton score.'

To explain the elements of the 'skeleton score' system in terms of advantages over the 'full score' system — for the end goal of the present invention — a primary advantage of the 'skeleton score' is the isolation from a 'full score' of its entire melodic line, and the leveling of this melodic line — that in a 'full score' may be scattered through as many as twenty staves — to a single stave, upon which single stave the melodic line is seen in smooth continuity as it is passed from one to the other of the participating voices.

Another advantage of the 'skeleton score' — eliminating a major impediment of the standard 1 full score' — is that 'transposing instruments' are already transposed to consistent pitch, and 'movable clefs' are already altered to the familiar and fixed treble and bass clef positions, thus allowing the notation of the overall single staved score to be read without encumbrance.

A further and most significant advantage of the 'skeleton score' — for grasp of melodic clarity — is the functional and graphic delineation of the melodic line so that its structure, unity and musical meaning may be apprehended at a glance. This is achieved by a page layout in which the traditional 'logic of printing' is necessarily abandoned for the logic inhering in the music itself. Freed from the rigidity of vertical scoring of part writing, the 'skeleton score' forfeits convention and symmetry of margin and note-head spacing for the dictates of musical necessity, whereby the unilinear expanse of melody may pursue its own destiny across and down the page, line by line a continuation of the single stave, each line — long or short consistent with its thematic span — picking up a consecutive phase of the thematic order and shading off with phrased cadence.

Unlike the 'full score' in which phrasing is severed and interrupted for typographical expedience, in the 'skeleton score,' phrases and sentences are graphically displayed as uninterrupted musical units, their visual wholeness evoking aural images as such. And, unlike the 'full score' where melodic continuity may be spread over as many as several hundred pages, in the 'skeleton score' the entire melodic line is brought within concise viewing focus that can be perceived immediately and directly.

Still another advantage of the 'skeleton score' is the device of aligning bar lines in a manner that imparts at a glance significant intra-musical aspects of thematic consecution. For example, where thematic lines are repeated, their bar lines coincide in the same vertical path, in order that the 'repeat' — exact or modified — may be seen. And by the same token that the coincident bar lines immediately identify repeated and like passages, new and contrasting passages are in evidence by the noncoincident bar lines.

As a further air toward melodic comprehension, a 'synoptic analysis' of the whole melodic design is inscribed in perpendicular direction at left margin down the height of the page, giving thematic index to each musical unit. Proceeding from this perpendicularly delineated analysis, extended annotations may pursue the melody into the staves indicating structural landmarks or climactic points in phrasing as they occur. Concise, graphic — uncluttered by excessive or formal terminology — the 'synoptic anaylsis,' with extended annotations if any, is an important aid in retaining in the arual memory thematic relationships, and coherence of the whole melodic procedure.

Thus, in the 'skeleton score,' whole themes or significant phases of their development are marshalled across and down the page, 'musically' delineated, and contained within a single format to be viewed as a composite musical design. It will be appreciated that in this there is no rigid prescription, but that the concept of focusing the melodic outline of a composition within a single field of vision — like a painting within a frame — is to be carried out in as wide a latitude as the employed visual medium and field of optical vision allow. For the purpose of immediate melodic grasp, this is a vast advantage over the standard 'full score' where the overall melodic line — spread over numerous pages and in formless manner — is obscured from view.

Whereas the foregoing has disclosed the essential elements of the key 'skeleton score' which represents in the aggregate the puzzle game completed and solved, the following will depict in detail the separate parts of both puzzle game and correlated phonorecord, the 'puzzle game-phonorecord' combination, illustrating one preferred embodiment for carrying the invention into practical effect.

For further comprehension of the objects, features, and advantages of the invention, reference will be had to the specifications, accompanying drawings, and the appended claims hereinafter more particularly set forth.

In the drawings:

FIG. 2 is a representative movable member or puzzle strip, upon which is inscribed a representative notated stave that portrays a 'whole' musical sentence;

FIG. 3 shows the correlated phonorecord embodiment in a series of three related disks.

Figure 1:
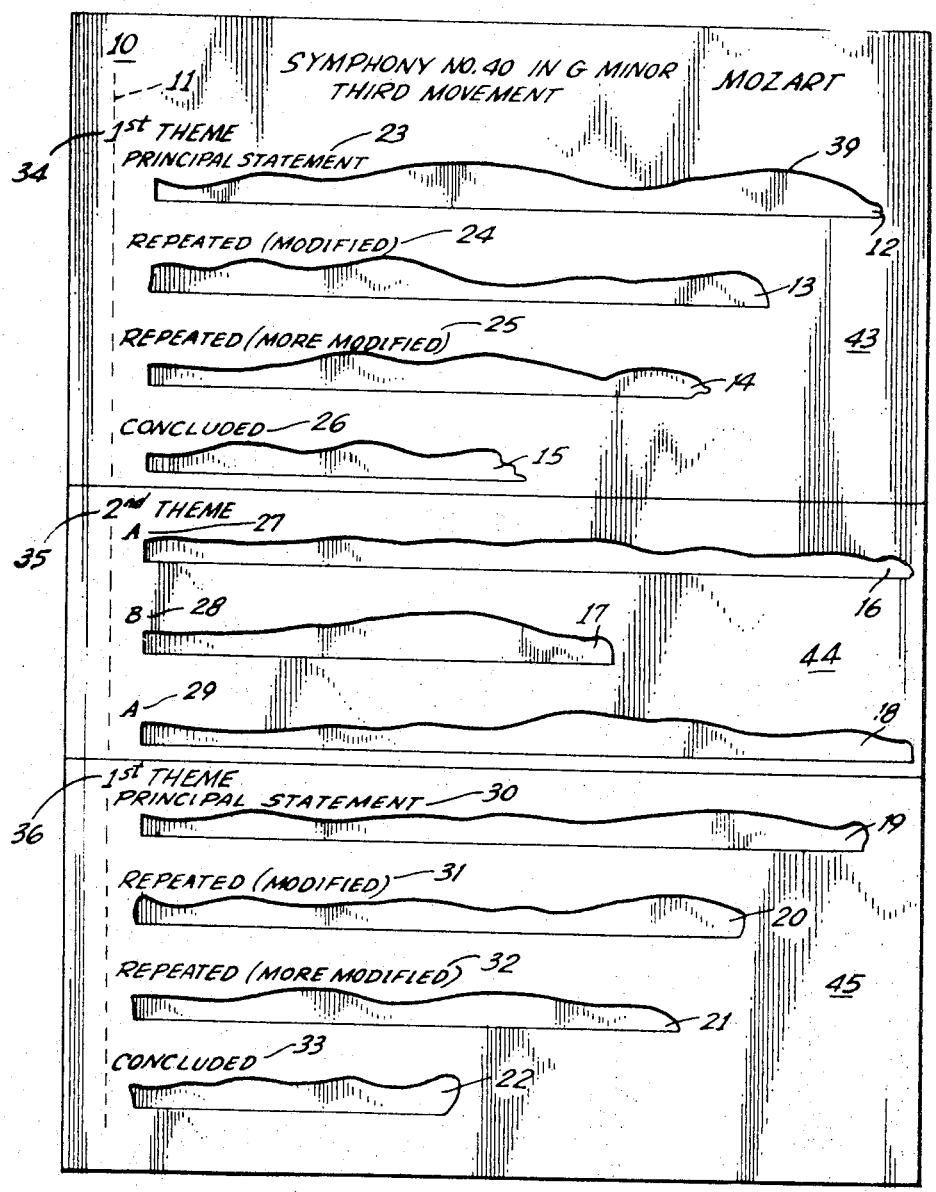
FIG. 1 is a plan view of the puzzle game playing board as it would appear with the movable members removed.

Referring to the several figures, FIG. 1 represents a 'playing board,' a stationary base-like form designated as board 10, upon the face of which — at left margin in perpendicular direction down height of board — is inscribed a synoptic analysis 11, hereinbefore described in connection with the key 'skeleton score' and hereinafter represented by a synoptic analysis of the Third Movement of Mozart's Symphony in G Minor. Across the width of board 10 appear horizontal linear-shaped empty spaces designated as receiving positions 12–22, which have been formed by the removal from board 10 of the delineated melodic line of a page of 'skeleton score' (the Third Movement of Mozart's Symphony in G Minor, a facsimile of which originally had been imprinted upon the playing board), the length of each receiving position to the measure of each consecutively lined melodic unit that had been removed. Disposed at spaced points at left margin down height of board 10 — like a unilateral plumb line supporting the associated horizontally disposed receiving positions 12–22 — are thematic indices 23–33 of synoptic analysis 11 under three main headings: Ist Theme 34, 2nd Theme 35, and return of Ist Theme 36.

FIG. 2 shows the first only (as representative) of the plural 'movable members' designated as puzzle strip 37, the puzzle strps having been formed by their removal from board 10 and being equal in number to their complementary receiving positions 12–22, the characteristic edges 38 of the puzzle strips fitting the characteristic edges 39 of the receiving positions, the characteristic edges of each puzzle strip and complementary receiving position being differentiated from the characteristic edges of all the other puzzle strips and their complementary receiving positions. Upon the face of each puzzle strip 37 is inscribed a notated stave 40 (as representative), the length of each puzzle strip 37 long or short consistent with the thematic span of notated stave 40 inscribed therein, each notated stave 40 representing a functional thematic unit of the whole melodic design, bar line 41 (as representative) of each notated stave 40 being structurally aligned with bar lines of succeeding notated staves, to display either similar or contrasting thematic treatment as hereinbefore described in connection with the key 'skeleton score.'

The thematic indices 23–33 of synoptic analysis 11 serve as clues, aiding the player to relate a thematic index and associated receiving position on board 10 with a complementary puzzle strip 37, when — in the course of the game — each puzzle strip is returned to the receiving position to which it belongs to reconstruct in assembled relation the composite musical design.

If the player has made an incorrect judgement with regard to matching a notated puzzle strip with a thematic index on board 10, the puzzle strip will not fit the receiving position, and the player should then review his judgment and consult, if necessary, the key 'skeleton score.' No rigid procedure, however, is prescribed for reconstructing the puzzle in assembled relation — this will depend upon the level of musical experience of the individual player. But one challenging way may be that the player first reproduce a selected theme on the phonorecord (see FIG. 3 description), and then test his 'aural' sense in finding the correct puzzle strip — without referring to thematic indices on board 10 — by identifying the melodic-rhythmic character of the theme that is heard with the melodic-rhythmic character of the notation seen on its correlated puzzle strip, and also by identifying the tonal range of the principle instrument carrying the melody with the notated octave range of its correlated puzzle strip — instrumental cues 42 inscribed beneath notated stave 40 on puzzle strip 37 serving as clues.

Other clues may be had for locating on board 10 the correct thematic index and associated receiving position for a complementary notated puzzle strip, such as the use of contrasting colors, whereby the constituents of one thematic group are identifiable with each other yet distinguishable from those of other thematic groups. Thus, in the illustrated embodiment of the Mozart movement hereinbefore referred to, the entire area 43 on board 10 occupied by the Ist Theme 34 grouping, including thematic indices 23–26 and associated receiving positions 12–15, and the complementary puzzle strip 37 to each, may be in one color; the entire area 44 occupied by the 2nd Theme 35 grouping, including thematic indices 27–29 and associated receiving positions 16–18, and the complementary puzzle strip 37 to each, in a second color; and the entire area 45 occupied by the returned Ist Theme 36 grouping, including thematic indices 30–33 and associated receiving positions 19–22, and the complementary puzzle strip 37 to each, in a third color. A further clue may be given in the color of the coincident bar lines 41 that are aligned in the same vertical path as hereinbefore referred to, bar lines 41 to appear in a fourth color, a color common to all the coincident bar lines but contrasting with the colors of areas 43, 44 and 45 on board 10.

It is to be understood that such colors as may be employed in the puzzle game are not intended as color imagery for theme, key, or tone, but merely as identifying clues for reconstructing the puzzle game.

Referring now to FIG. 3, for illustrative and explanatory purposes and not to be construed as limitative, three related phonorecord disks are shown, designated by the reference characters 46A, 46B and 46C respectively, in each of which is embodied the same Mozart movement that is embodied in the puzzle game, phonorecords 46A, 46B and 46C rendering in full orchestral context the Mozart movement that in the puzzle game the melodic line only thereof is displayed, as hereinbefore described in connection with the key 'skeleton score.'

Phonorecord 46A correlates with each individual melodic unit that is shown consecutively in the puzzle game. Upon the face of phonorecord 46A may be seen a plurality (eleven) of recorded bands 47–57 — the sound grooves, and a plurality (eleven) of crossovers 58–68 — the silent annular spaces between the sound grooves. The number of recorded bands 47–57 are equal to the number of receiving positions 12–22 complementary to the number of puzzle strips 37 on board 10, each of the recorded bands 47–57 correlated with a notated stave 40 inscribed upon puzzle strip 37, each recorded band wide or narrow consistent with the thematic span of each notated stave 40 respectively, each notated stave as hereinbefore described representing a functional unit of the whole musical design. Though in the puzzle game these units are shown consecutively and in undisturbed continuity, in phonorecord 46A there will be a pause between each unit — the pauses being created by silent crossovers 58–68, a crossover preceding each of recorded bands 47–57.

In a common path from the outer border of the phonorecord 46A towards the center of the disk will be imprinted into the blank spaces or crossovers 58–68, the synoptic analysis 69 and thematic indices 70–80 thereof, the width of the crossovers to be great enough to accommodate the printed matter legibly. The synoptic analysis 69 and thermatic indices 70–80 thereof — which will be seen to match synoptic analysis 11 and thematic indices 23–33 thereof of board 10 — exposes at a glance, upon face of phonorecord 46A, the sense and structure of the music about to be reproduced, and enables the hearer to pinpoint and locate by selection and with absolute precision, each individual musical passage where it occurs in the recorded grooves of the phonorecord disk. Thus, each functional melodic unit as represented on puzzle strip 37 is reinforced by its immediate location on phonorecord 46A, allowing swift correlation of the visual representation with its aural counterpart. And further, the synoptic analysis and thematic indices processed into the crossovers of the phonorecord embodiment, make unnecessary the recording of verbal instruction which customarily is contained within sound grooves of instructional records. In the phonorecord correlated with the puzzle game of the present invention, the sound grooves render the music only, uncluttered by distracting verbal interpolations.

The lettering of synoptic analysis 69 and thematic indices 70–80 of phonorecord 46A may be imprinted in colors to match the puzzle game colors of board 10. One preferred way: the lettering of Ist Theme 81 group of thematic indices — imprinted in crossovers 58–61 — may be in color matching the common color of area 43 of board 10; the lettering of 2nd Theme 82 group of thematic indices 74–76 — imprinted in crossovers 62–64 — may be in color matching the common color of area 44 of board 10; and the lettering of returned Ist Theme 83 group of thematic indices 77–80 — imprinted in crossovers 65–68 — may be in color matching the common color of area 45 on board 10. The colored lettering shall be boldly and conspicuously seen, but — as in the use of color in the puzzle game — it is to be understood that such colors as may be employed in phonorecord 46A described herein, aNd correspondingly in 46B described hereinafter, are not intended as color imagery for theme, key, or tone, but merely for legibility to facilitate rapid location of thematic landmarks on the face of the phonorecords, correlative to the identifying colors in the puzzle game.

Phonorecord 46B correlates with the overall areas of board 10, areas 43, 44 and 45 respectively. Upon the face of phonorecord 46B may be seen three recorded bands 84–86, the width of each recorded band being consistent with the overall thematic span of each entire area of board 10, each of recorded bands 84–86 reproducing in undistrubed continuity the consecutive thematic units a correlated visual area embraces, a pause or crossover occurring between each overall area reproduced as distinguished from phonorecord 46A where a pause occurs between each individual unit.

Three in number, the pauses or crossovers 87–89 of phonorecord 46B — a crossover preceding each of recorded bands 84–86 — shall have imprinted therein respectively, three main headings: Ist Theme 90, 2nd Theme 91 and return of Ist Theme 92, corresponding with the three main headings Ist Theme 34, 2nd Theme 35 and return of Ist Theme 36 of board 10. Accordingly, recorded band 84 designated in crossover 87 as Ist Theme 90 correlates with the entire area 43 of board 10, including the Ist Theme 34 group of thematic indices 23–26 thereof; recorded band 85 designated in crossover 88 as 2nd Theme 91 correlates with the entire area 44 of board 10, including the 2nd Theme 35 group of thematic indices 27–29 thereof; and recorded band 86 designated in crossover 89 as returned Ist Theme 92 correlates with the entire area 45 of board 10, including the returned Ist Theme 36 group of thematic indices 30–33 thereof. Corresponding with phonorecord 46A, the lettering imprinted in the crossovers of phonorecord 46B may be in color; the lettering of Ist Theme 90 in crossover 87 in color matching the common color of areas 43 of board 10; the lettering of 2nd Theme 91 in crossover 88 in color matching the common color of area 44 of board 10; the lettering of returned Ist Theme 92 in crossover 89 in color matching the common color of area 45 of board 10.

Phonorecord 46C represents a culminating rendition of the Mozart movement that is embodied in the puzzle game, the entire movement being rendered in undistrubed continuity as a composite aural design — correlating wiht the visual whole of the puzzle assembled and solved on board 10 — to be listened to with full understanding and enjoyment.

As used herein, the term 'aural' includes any physical means of sound reproduction that may effectively correlate with the visual means of the invention. It will also be understood that the term 'playing board' includes any means for physically representing the visual constituents of the invention in a stationary format as a composite whole, and the term 'movable member' includes any means for physically representing 'musical units' that are movable or that move, so that they may be assembled or activated into the stationary whole. Thus it is within the scope of the present invention to carry out the principles thereof in such media as animated motion picture and photo slide correlated with sound — synchronized, narrated or otherwise communicated — and employing whatever machine, device or mode of execution now known or later developed that are suitable thereto.

Further, as used herein, the term 'visual' includes any physical means for representing the notated principal line of a musical work in musicianly structured format that may be read structurally, i. e., musically. As we the skeleton and structural character of the readable component of this invention would be of particular advantage to a blind reader, aiding him towards 'clarity in listening' according to the principles set forth in this application, it is further within the contemplation of my invention that the visual means be translated or transmitted into such system of reading music for the blind, now known or later developed, as would be most efficacious.

The puzzle game embodiment herein disclosed provides a challenging dimension in the study of melodic outlining and its structured unity whereby a player — sighted or blind — may exercise his musical sense, reconstructing by himself the essential structural elements of a tonal design. By handling the disassembled themes, recognizing whole musical units by sight or touch and organizing them in their proper receiving positions on the playing board — aided by correlated sound reproduction — the player becomes intimately responsive to thematic wholes, thematic relationships and coherence of melodic procedure.

Since changes in details of materials, processes, and construction may readily occur to those skilled in the specialized media employed, accordingly, all suitable modifications and equivalents may be resorted to without departing from the spirit of the invention.

I claim:

1. A music teaching aid comprising:
a board having a plurality of recesses in the surface thereof; a plurality of puzzle strips, each of said strips having one of a plurality of complete musical themes notated in terms of a single horizontal music staff with bar lines and musical notes appropriately spaced thereon; said strips being configured to fit into correspondingly shaped recesses; said recesses and said strips being arranged on said board in a vertical fashion in the order of appearance of each of said themes in a musical composition; indicia appearing on said board adjacent each recess for identifying the theme corresponding to said recess; recording means for providing audible renditions of said themes, said themes being recorded in segments, said segments being arranged on said recording means in the same order as said strips on said board; and indicia appearing on said recording means adjacent each of said segments for identifying the recorded theme.

2. A music teaching aid as in claim 1 wherein said themes, when correctly positioned on the board, have their left edges vertically aligned, and said bar lines of similar themes are vertically aligned so that modifications of said themes are readily apparent.

3. A music teaching aid as in claim 1 wherein said recording means comprises at least two phonograph records, the said segments of one including a single theme only and the said segments of another including a plurality of related themes.

4. A music teaching aid as in clim 1 wherein each of said puzzle strips have indicia adjacent said staff identifying the musical instrument which plays the respective theme on the said recording means.

* * * * *

UNITED STATES PATENT OFFICE
CERTIFICATE OF CORRECTION

Patent No. 3,769,872　　　　　　　　　Dated November 6, 1973

Inventor(s) Violet Katzner Andrews

It is certified that error appears in the above-identified patent and that said Letters Patent are hereby corrected as shown below:

Column 1, line 11, "most," should read -- most --;

line 59, "dimensions" should read -- dimension --.

Column 2, line 10, "musicians's" should read -- musician's --;

line 28, "hole" should read -- hold --;

line 38, "rading" should read -- reading --;

line 50, "familiary" should read -- familiar --.

Column 3, line 36, "molodic" should read -- melodic --;

line 65, "of" should read -- or --.

Column 4, line 17, after "standard" delete "1" and before the word "full" insert -- ' --.

Column 5, line 66, "strps" should read -- strips --.

Column 6, line 11, "therein" should read -- thereon --.

Column 7, line 46, "thermatic" should read -- thematic --.

Column 8, line 15, "aNd" should read -- and --;

line 61, "trubed" should read -- turbed --;

line 62, "wiht" should read -- with --.

UNITED STATES PATENT OFFICE
CERTIFICATE OF CORRECTION

Patent No. 3,769,872             Dated November 6, 1973

Inventor(s) Violet Katzner Andrews

It is certified that error appears in the above-identified patent and that said Letters Patent are hereby corrected as shown below:

Column 9, line 18, "As we" should read -- And as --.

Column 10, line 36, "clim" should read -- claim --.

Signed and sealed this 30th day of April 1974.

(SEAL)
Attest:

EDWARD M. FLETCHER, JR.
Attesting Officer

C. MARSHALL DANN
Commissioner of Patents